(No Model.) 2 Sheets—Sheet 1.

C. McDONAGH.
FLOWER POT MACHINE.

No. 427,354. Patented May 6, 1890.

Witnesses:
P. M. Hulbert
Edm. Bready

Inventor
Charles McDonagh
By James Whittemore
Att'y (No Model.) 2 Sheets—Sheet 2.

C. McDONAGH.
FLOWER POT MACHINE.

No. 427,354. Patented May 6, 1890.

Witnesses:
P. M. Hulbert
E. McBrearty

Inventor:
Charles McDonagh
By James Whittemore
Atty.

THE NORRIS PETERS CO., PHOTO-LITHO., WASHINGTON, D. C.

UNITED STATES PATENT OFFICE.

CHARLES McDONAGH, OF TOLEDO, OHIO, ASSIGNOR OF ONE-HALF TO JOHN McCAFFREY, OF SAME PLACE.

FLOWER-POT MACHINE.

SPECIFICATION forming part of Letters Patent No. 427,354, dated May 6, 1890.

Application filed October 12, 1889. Serial No. 326,867. (No model.)

*To all whom it may concern:*

Be it known that I, CHARLES McDONAGH, a citizen of the United States, residing at Toledo, in the county of Lucas and State of Ohio, have invented certain new and useful Improvements in Flower-Pot Machines, of which the following is a specification, reference being had therein to the accompanying drawings.

This invention relates to new and useful improvements in flower-pot machines; and the invention consists in the combination, with a flower-pot-molding machine, of a lining adapted to be placed within the mold, which is adapted to be taken out with the pot, whereby the danger of breakage is obviated and the resultant article of manufacture is greatly improved, all as more fully hereinafter described.

Figure 1:
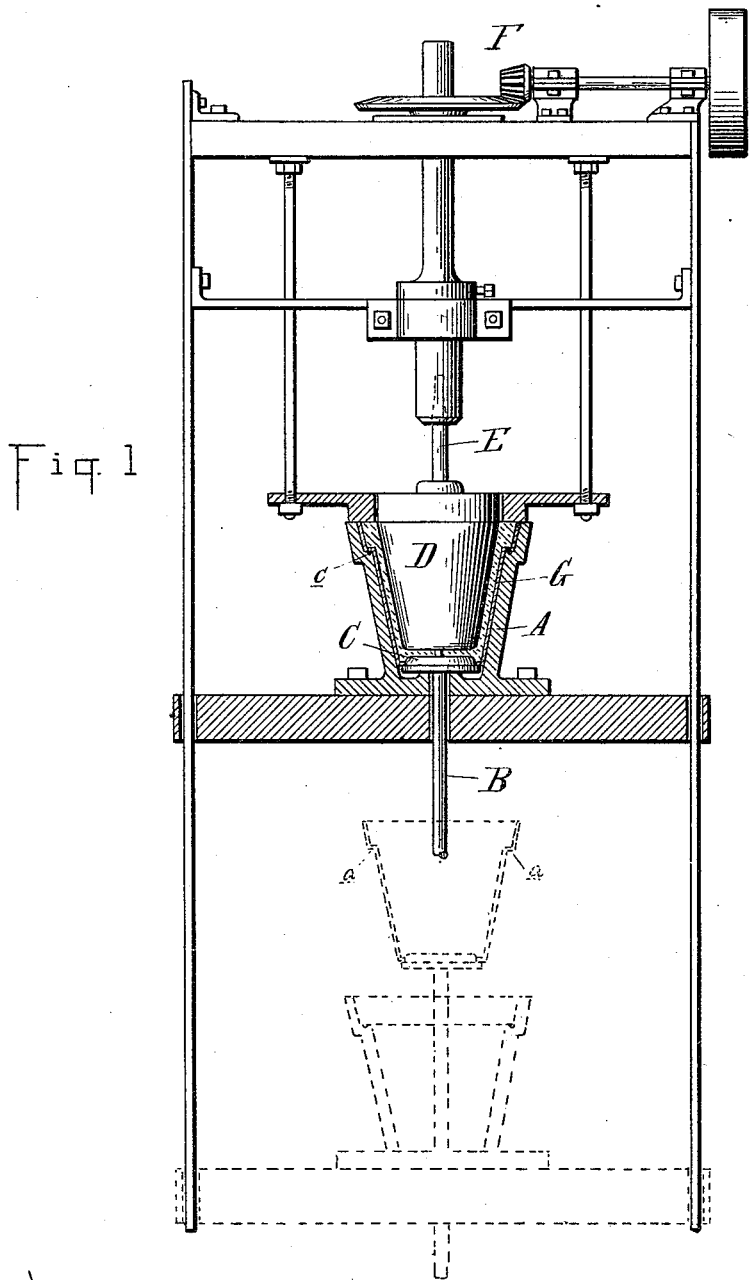
Figure 2:
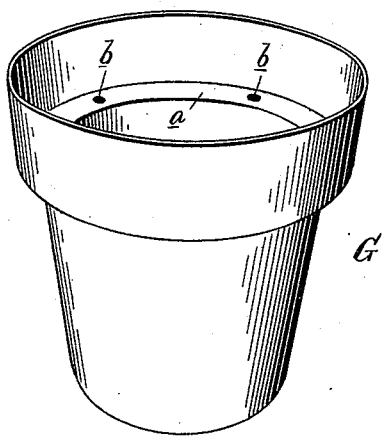
Figure 3:
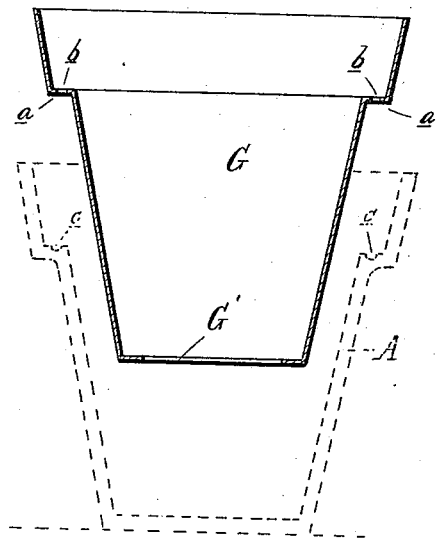

In the drawings which accompany this specification, Figure 1 is a vertical central section through the molds of a machine to which my invention is applied. Fig. 2 is a perspective view of my improved lining. Fig. 3 is a vertical central section through Fig. 2.

A is the vertically-reciprocating mold, of the desired shape to which the outside of the pot is desired to be fashioned. This may be secured to any suitable base.

B is a pusher seated in the bottom thereof and having an enlarged head C, forming the bottom of the mold, and which is adapted to push the pot out from its position after it is completed.

D is a revolving mold or former, the exterior of which conforms in shape to the interior of the pot desired to be formed. This is connected with a suitable shaft E and adapted to be driven by any suitable mechanism, such as shown at F, and having means to reciprocate it vertically.

G is the lining for my mold, which is the shape to fit the mold A. This lining I preferably make of light sheet metal having an aperture G' at the bottom.

The parts being thus constructed and arranged, the operation of the machine is as follows: The lining being secured in position in the mold A, the clay desired to be molded into a pot being placed therein, the mold A is raised to contact with the revolving former E, which latter is revolved until the clay assumes the shape of a pot in the well-known manner. When the pot is thus formed, the mold A is lowered to the position shown in dotted lines, where the pusher B will push out the lining G with the pot therein. This lining with the pot is now placed in the drying-room, where the lining soon loosens and may be taken off, and then may be used to repeat the operation.

The object of the lining is to overcome the objection which has heretofore been found in the manufacture of such pots in removing the same from the mold, due to the adhesion of the clay to the molds, for when the pusher B is moved upward to release the pot from its position the clay adhering to the side of the molds will cause it to be bent out of shape, and thus destroy the pot. By the use of my lining all such trouble is obviated and the molding of pots is very greatly facilitated, as they can be taken out much more quickly and handled more readily without danger of damaging their shape with the lining in position than without it.

The ordinary type of flower-pot is provided with a shoulder $a$, and the detachable lining G is also provided with a similar shoulder. In order to more easily perfect the shoulder, I make in such shoulders apertures $b$, for the purpose of allowing of the escape of the air from the mold, and I also form an annular groove $c$ in the mold below the apertures $b$ for assisting to the same end.

What I claim as my invention is—

1. In a flower-pot machine, a detachable lining for the mold having apertures $b$, substantially as described.

2. In a flower-pot machine, the mold A, having groove $c$, and the detachable lining for the mold having apertures $b$, substantially as described.

In testimony whereof I affix my signature, in presence of two witnesses, this 13th day of September, 1889.

CHAS. McDONAGH.

Witnesses:
ED. McBREARTY,
P. M. HULBERT.